Aug. 16, 1955     C. A. THOMAS, JR     2,715,346
PIPE NIPPLE EXTRACTOR
Filed Nov. 10, 1953
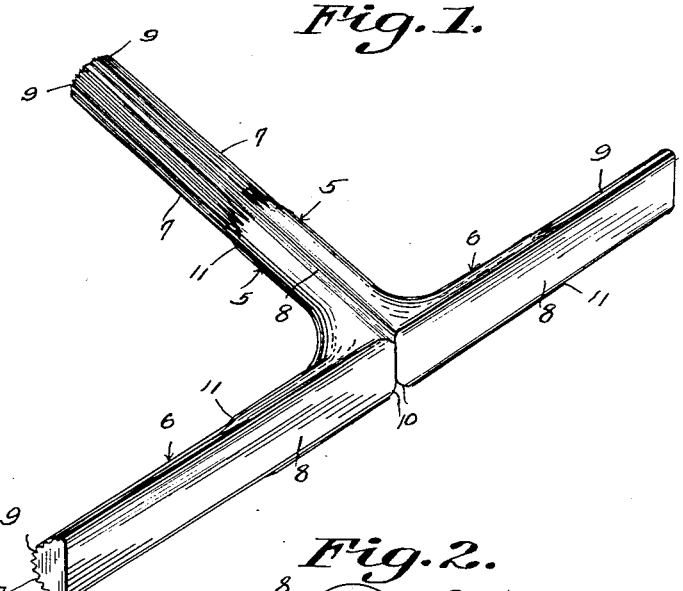
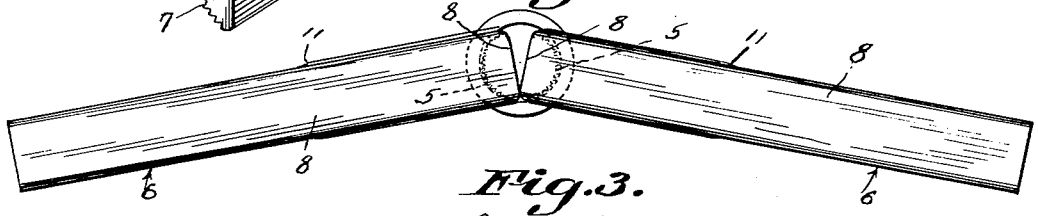
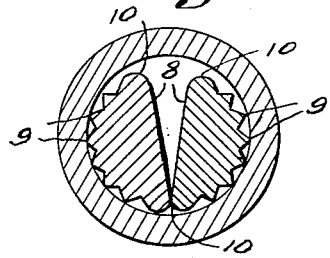
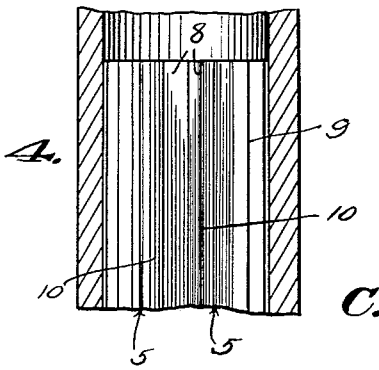
C. A. Thomas Jr.
INVENTOR

United States Patent Office 2,715,346
Patented Aug. 16, 1955

2,715,346
PIPE NIPPLE EXTRACTOR

Columbus A. Thomas, Jr., West Palm Beach, Fla.

Application November 10, 1953, Serial No. 391,275

2 Claims. (Cl. 81—72)

This invention relates to a nipple or bushing extractor, the primary object of the invention being to provide a tool of this character which may be readily and easily inserted within a nipple or bushing to be extracted from its fitting.

An object of the invention is to provide a nipple extractor embodying a pair of identical separable members so constructed and arranged that when the members are properly positioned within a nipple to be extracted, with one of the members held stationary while the other member is turned against the stationary member, the members will become wedged within the nipple so that the nipple may be readily unscrewed and removed from the fitting.

Another object of the invention is to provide separable members, each of which comprises right angled extensions of different sizes, thereby providing a nipple extractor which is adjustable for size, and capable of use in extracting nipples of different diameters.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a perspective view of a nipple extractor constructed in accordance with the invention.

Fig. 2 is an elevational view illustrating the nipple extractor as positioned within a nipple, with the members of the nipple extractor moved to cause them to wedge against the surface of the nipple.

Fig. 3 is a sectional view through the extensions of the nipple extractor, positioned within a nipple, illustrating the biting effect of the nipple extractor, on the inner surface of the nipple.

Fig. 4 is a longitudinal sectional view through a section of a nipple with the nipple extractor positioned therein.

Referring to the drawing in detail, the nipple extractor forming the subject matter of the present invention, embodies a pair of identical members, each of which comprises extensions 5 and 6, the extensions of each member being formed integral, and extended at right angles with respect to each other as clearly shown by Fig. 1 of the drawing.

The extensions 5 of the members, are slightly smaller in diameter than the extensions 6, so that the device may be used for removing nipples of various diameters.

As clearly shown by the drawing, each extension is formed with an outer curved surface 7 and an inner flat surface 8, so that in using the tool, the flat surfaces of certain extensions may be brought together providing an extension which is circular in cross section which may be fitted within the nipple to be removed.

Due to this construction, it will be obvious that when the flat surfaces of the larger extensions of the members are brought together, the tool is adapted for positioning in a nipple of larger diameter.

As clearly shown by Fig. 3 of the drawing, the extensions when positioned within a nipple to be removed, are placed with their flat surfaces contacting. One of the members is now held stationary by the extension that is disposed at the outer end of the nipple, while the other extension is rotated. This action causes a wedging of the extensions within the nipple with the result that the extensions bite into the inner surface of the nipple securely connecting the tool to the nipple.

Sharp ribs 9 are formed longitudinally of the extensions, and extend throughout substantially one-half of the length of each extension, providing a shoulder 11 at the inner ends of the ribs constituting a stop to prevent the tool from being positioned too far into the bushing.

It will also be noted that the contacting edges of the tool members are rounded at 10 providing cam surfaces to prevent binding of the contacting tool members with respect to each other and permit of rotation of one member with respect to the other, while in operation, to cause such wedging action, between the tool and bushing being removed.

From the foregoing it will be seen that due to the construction shown and described I have provided a tool which is capable of being inserted in nipples of various sizes, so that by rotating the tool, the tool will become lapped to the nipple with the result that upon rotating the tool, the nipple may be unscrewed from its fitting and removed without damage.

It will of course be understood that in the use of the tool, the extensions of identical size will be brought together as a pair for insertion in the nipple, while the opposite extensions constitute a handle for the tool by means of which the operation of the tool may be effected.

Having thus described the invention, what is claimed is:

1. A nipple extracting tool comprising opposed disconnected members, each of said members embodying a pair of extensions extending at right angles with respect to each other, each of said extensions having a rounded surface and a flat surface, the flat surfaces of one of the respective extensions of each member adapted to be placed together providing a rounded tool for positioning in a nipple, the other extensions of said members extending laterally away from each other and providing a cross handle for effecting rotation of the tool and nipple within which said tool is positioned.

2. A nipple extracting tool comprising a pair of separable identical disconnected members, each of said members embodying extensions of different sizes disposed at right angles with respect to each other, said extensions having rounded surfaces and flat surfaces, said flat surfaces of the two members adapted to be placed in contact with each other providing a substantially circular nipple gripping tool, the other extensions of said members extending laterally away from each other and providing cross handles for effecting movement of one member with respect to the other member and for rotating the tool as a whole within the nipple, and each of said extensions having rounded contacting edges providing cams for wedging the rounded surfaces of the tool into engagement with the nipple, during operation of the tool.

References Cited in the file of this patent

UNITED STATES PATENTS

| | | |
|---|---|---|
| 1,388,744 | Morrissey | Aug. 23, 1921 |
| 1,816,997 | Brown | Aug. 4, 1931 |
| 1,880,172 | Bergman et al. | Sept. 27, 1932 |